US012645595B1

(12) United States Patent

Chuan

(10) Patent No.: US 12,645,595 B1
(45) Date of Patent: Jun. 2, 2026

(54) POINT-OF-COHERENCE EXCLUSIVE MONITOR FOR A CACHE COHERENT INTERCONNECT FOR A MULTI-CORE ELECTRONIC SYSTEM

(71) Applicant: ARTERIS, INC., Campbell, CA (US)

(72) Inventor: Boon Chuan, Scotts Valley, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 19/009,911

(22) Filed: Jan. 4, 2025

(51) Int. Cl.
   *G06F 12/0815*    (2016.01)
   *G06F 12/08*    (2016.01)
   *G06F 12/0813*    (2016.01)

(52) U.S. Cl.
   CPC .......... *G06F 12/0815* (2013.01); *G06F 12/08* (2013.01); *G06F 12/0813* (2013.01)

(58) Field of Classification Search
   CPC ... G06F 12/0815; G06F 12/08; G06F 12/0813

USPC ................................................. 711/141, 118
See application file for complete search history.

(56) References Cited

U.S. PATENT DOCUMENTS

2022/0309002 A1*   9/2022   Yang ................... G06F 12/0811
2024/0211400 A1*   6/2024   Diamand ............ G06F 12/0815

* cited by examiner

*Primary Examiner* — Hosain T Alam
*Assistant Examiner* — Zubair Ahmed
(74) *Attorney, Agent, or Firm* — Jubin Dana; Dana Legal Services

(57) ABSTRACT

An electronic system includes a plurality of logical processors, an interconnect, shared memory accessible by the logical processors via the interconnect, and a system directory. The system directory includes one or more tagged monitors at a first tier and a basic monitor at a second tier. The tagged monitors are configured to maintain exclusive cache coherence over a first set of addresses in the shared memory. The basic monitor is configured to maintain exclusive cache coherence over addresses in the shared memory that are not monitored by the tagged monitors.

20 Claims, 10 Drawing Sheets

FIG. 3

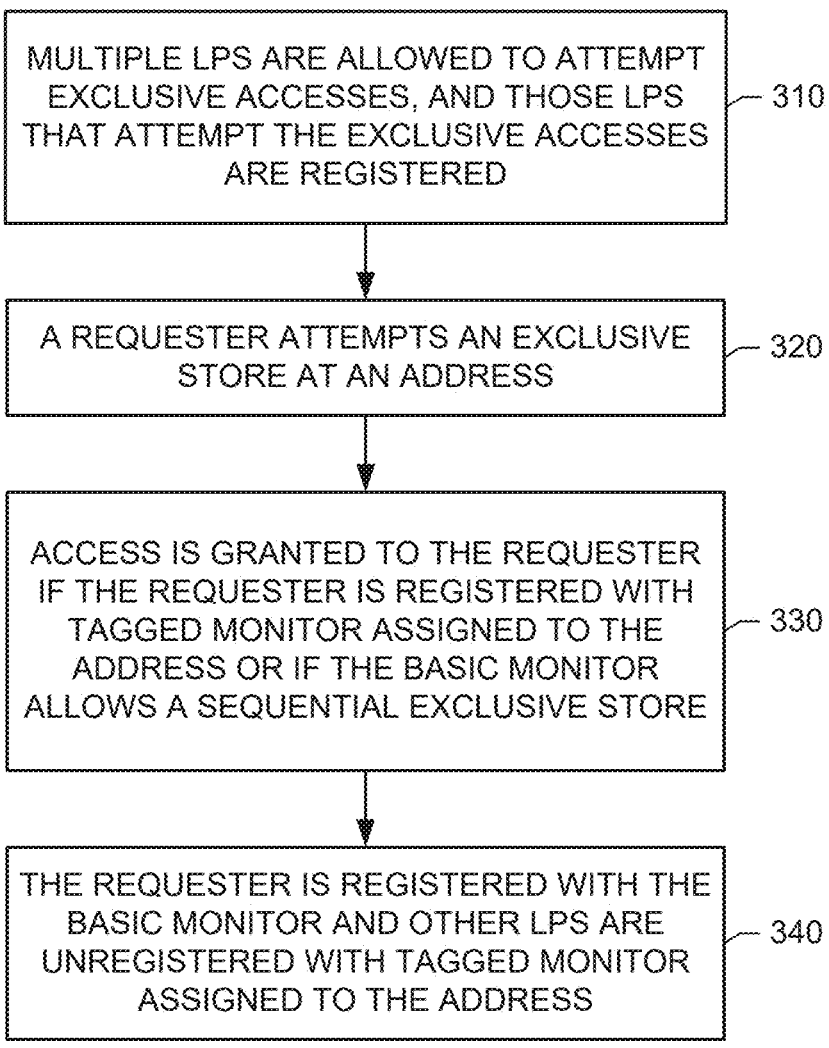

MULTIPLE LPS ARE ALLOWED TO ATTEMPT EXCLUSIVE ACCESSES, AND THOSE LPS THAT ATTEMPT THE EXCLUSIVE ACCESSES ARE REGISTERED — 310

A REQUESTER ATTEMPTS AN EXCLUSIVE STORE AT AN ADDRESS — 320

ACCESS IS GRANTED TO THE REQUESTER IF THE REQUESTER IS REGISTERED WITH TAGGED MONITOR ASSIGNED TO THE ADDRESS OR IF THE BASIC MONITOR ALLOWS A SEQUENTIAL EXCLUSIVE STORE — 330

THE REQUESTER IS REGISTERED WITH THE BASIC MONITOR AND OTHER LPS ARE UNREGISTERED WITH TAGGED MONITOR ASSIGNED TO THE ADDRESS — 340

FIG. 8

Initial State

| | LP A | LP B |
|---|---|---|
| Tagged Monitor 0 | 0 | 0 |
| Basic Monitor | 0 | 0 |

— 810

Exclusive Load to address X from LP A

| | LP A | LP B |
|---|---|---|
| Tagged Monitor 0:X | 1 | 0 |
| Basic Monitor | 0 | 0 |

— 820

Exclusive Load to address X from LP B

| | LP A | LP B |
|---|---|---|
| Tagged Monitor 0:X | 1 | 1 |
| Basic Monitor | 0 | 0 |

— 830

Exclusive Store to address X from LP A => Passed

| | LP A | LP B |
|---|---|---|
| Tagged Monitor 0 | 0 | 0 |
| Basic Monitor | 1 | 0 |

— 840

Exclusive Store to address X from LP B => Failed

| | LP A | LP B |
|---|---|---|
| Tagged Monitor 0:X | 0 | 1 |
| Basic Monitor | 1 | 0 |

— 850

Exclusive Store to address X from LP B => Passed

| | LP A | LP B |
|---|---|---|
| Tagged Monitor 0 | 0 | 0 |
| Basic Monitor | 1 | 1 |

— 860

Exclusive Store to address X from LP A => Passed

| | LP A | LP B |
|---|---|---|
| Tagged Monitor 0 | 0 | 0 |
| Basic Monitor | 1 | 0 |

Initial State ⌐ 910

|                     | LP A | LP B |
|---------------------|------|------|
| Tagged Monitor 0    | 0    | 0    |
| Basic Monitor       | 0    | 0    |

Exclusive Load to address X from LP A ⌐ 920

|                     | LP A | LP B |
|---------------------|------|------|
| Tagged Monitor 0:X  | 1    | 0    |
| Basic Monitor       | 0    | 0    |

Exclusive Load to address Y from LP B ⌐ 930

|                     | LP A | LP B |
|---------------------|------|------|
| Tagged Monitor 0:X  | 1    | 0    |
| Basic Monitor       | 0    | 1    |

Exclusive Store to address X from LP A => Passed ⌐ 940

|                     | LP A | LP B |
|---------------------|------|------|
| Tagged Monitor 0    | 0    | 0    |
| Basic Monitor       | 1    | 1    |

Exclusive Store to address Y from LP B => Passed ⌐ 950

|                     | LP A | LP B |
|---------------------|------|------|
| Tagged Monitor 0    | 0    | 0    |
| Basic Monitor       | 0    | 1    |

POINT-OF-COHERENCE EXCLUSIVE MONITOR FOR A CACHE COHERENT INTERCONNECT FOR A MULTI-CORE ELECTRONIC SYSTEM

TECHNICAL FIELD

The present technology is in the field electronic system design and, more specifically, design and implementation of multi-core electronic systems.

BACKGROUND

A multi-core electronic system may include multiple processors or cores that communicate with shared memory. Data is transferred to and from the shared memory in blocks of fixed size, called "cache lines" or "cache blocks."

Cache coherence is a protocol that maintains consistency of data stored in shared memory. When multiple cores are accessing the same memory locations in shared memory, cache coherence ensures that any changes made by one core are immediately visible to all other cores, thereby preventing data inconsistencies.

Exclusive access cache coherence is a protocol that is built on top of the cache coherence protocol. The exclusive cache coherence protocol allows a core to access a memory location atomically and coherently by performing an exclusive access sequence.

A directory-based protocol is commonly used to ensure cache coherency. A directory acts as a single serializing point through which permission is requested to store data in shared memory.

The directory can be distributed to improve scalability. Multiple directories may be used instead of a single directory. Each directory ensures cache coherence with respect to a range or slice of memory addresses.

SUMMARY

In accordance with various embodiments and aspects herein, an electronic system includes a plurality of logical processors, an interconnect, shared memory accessible by the logical processors via the interconnect, and a system directory. The system directory includes one or more tagged monitors at a first tier and a basic monitor at a second tier. The tagged monitors are configured to maintain exclusive cache coherence over a first set of addresses in the shared memory. The basic monitor is configured to maintain exclusive cache coherence over addresses in the shared memory that are not monitored by the tagged monitors.

In accordance with various embodiments and aspects herein, a cache-coherent network-on-chip (NoC) includes a plurality of initiator network interface units, a shared memory network interface unit, a transport interconnect configured to transport packets between the network interface units, and a system directory. The system directory includes one or more tagged monitors at a first tier and a basic monitor at a second tier. The tagged monitors are configured to maintain exclusive cache coherence over a set of semaphore addresses in the shared memory. The basic monitor is configured to maintain exclusive cache coherence over semaphore addresses in the shared memory that are not monitored by the tagged monitors.

In accordance with various embodiments and aspects herein, there is a directory-based method for an electronic system including a plurality of initiators, shared memory and an interconnect coupled to the initiators and the shared memory. The method includes performing tagged monitoring at a first tier to maintain exclusive cache coherence over a set of cache line addresses in the shared memory, and concurrently performing basic monitoring at a second tier to maintain exclusive cache coherence over cache line addresses in the shared memory that are not monitored by the tagged monitors.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

FIG. 3 shows a directory-based method of using a tagged monitor and a basic monitor in accordance with various aspects and embodiments herein.

FIG. 8 shows an example of states of a tagged monitor and a basic monitor in response to exclusive access sequences from two logical processors in accordance with various aspects and embodiments herein.

FIG. 9 shows another example of states of a tagged monitor and a basic monitor in response to exclusive access sequences from two logical processors in accordance with various aspects and embodiments herein.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
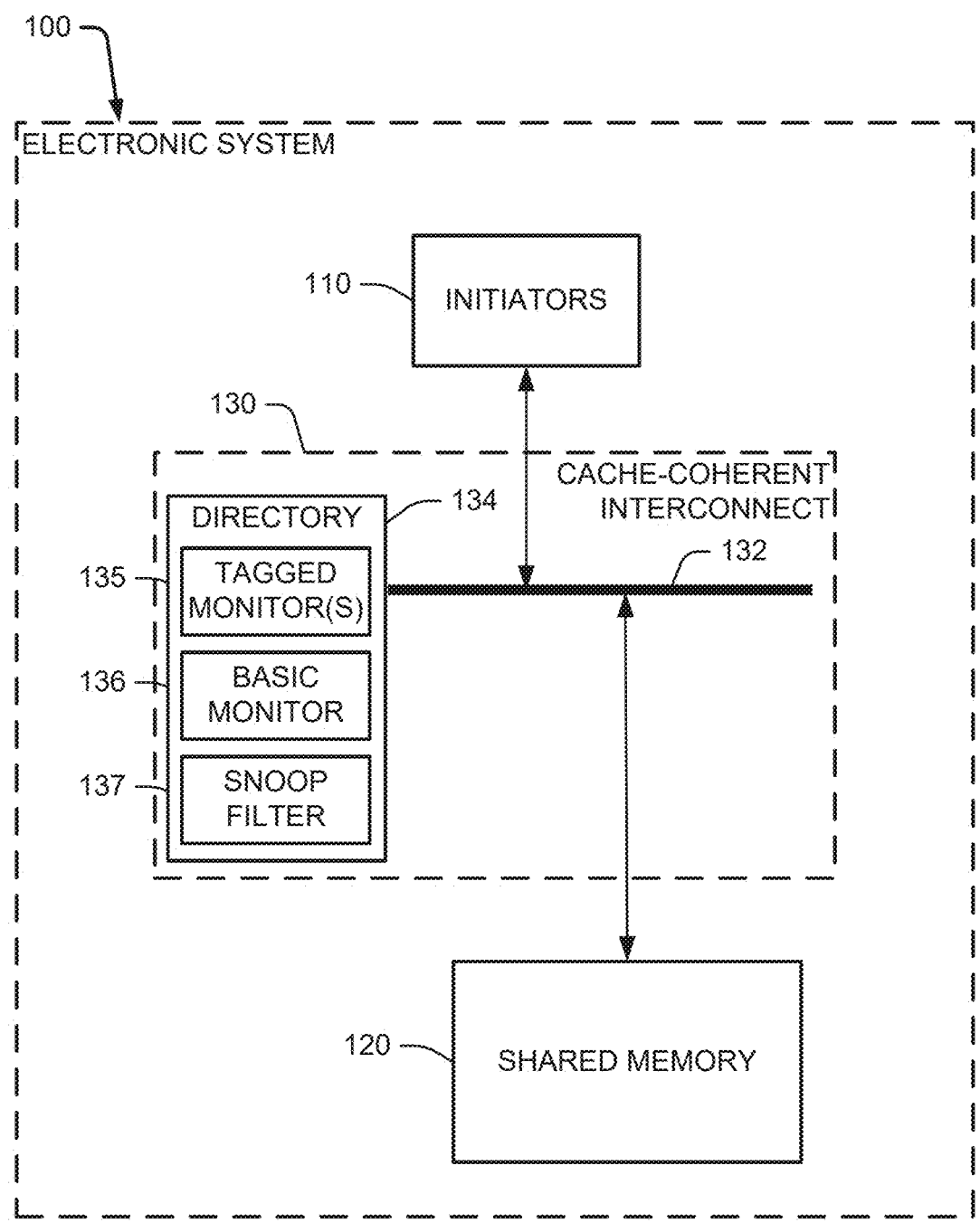
FIG. 1 shows an electronic system including a cache-coherent interconnect in accordance with various aspects and embodiments herein.

Reference is made to FIG. 1, which illustrates an electronic system 100 including a plurality of initiators 110. Examples of the initiators 110 include central processing unit (CPUs), graphical processing units (GPUs), and accelerators.

An initiator 110 such as a CPU may include multiples cores. Each core may execute multiple threads simultaneously. If, for example, a CPU has two physical cores and each core can handle two threads simultaneously, the CPU would be considered to have four logical processors. As used herein a "logical processor" or "LP" refers to a software thread running on a core.

The electronic system 100 further includes one or more targets. The targets include, but are not limited to, shared memory 120.

The electronic system 100 further includes a cache-coherent interconnect 130. The shared memory 120 is accessible to multiple logical processors via the cache-coherent interconnect 130.

In some embodiments, the shared memory 120 includes system memory. In some embodiments, the shared memory 120 may further include a separate cache in addition to the system memory. In some embodiments, the cache may be located inside the cache-coherent interconnect 130 as a system memory cache, or outside the cache-coherent interconnect 130 as a last level cache.

Addresses in the shared memory 120 are mapped to cache lines. As used herein, a cache line refers to a data block of fixed size. Typically, the fixed size is 64 bytes. Cache lines may also be stored in local caches of the initiators 110.

An LP may attempt an exclusive access of a cache line. For example, the exclusive access may include a sequence of an exclusive load and an exclusive store. As used herein, a "requester" refers to an LP that attempts an exclusive access.

The cache-coherent interconnect 130 includes an interconnect 132. The logical processors communicate with the shared memory 120 via the interconnect 132.

The cache-coherent interconnect 130 further includes a system directory 134 for ensuring cache coherence of the interconnect 132. The system directory 134 ensures cache coherence by maintaining consistency of shared data stored in the shared memory 120. When multiple logical processors are accessing the same memory locations in the shared memory 120, the system directory 134 ensures that any changes made by one logical processor are immediately visible to all other logical processors, thereby preventing data inconsistencies.

The system directory 134 includes one or more tagged monitors 135 at a first tier, and a basic monitor 136 at a second tier. The tagged monitors are configured to monitor exclusive access to a first set of cache line addresses in the shared memory 120. Each tagged monitor 135 refers to a collection of monitor bits for monitoring exclusive access to an assigned address. Each bit of a tagged monitor 135 corresponds to a logical processor. A tagged monitor 135 may be assigned an address by loading the address and registering an LP. When no LPs are registered with a tagged monitor, the tagged monitor is not being used. The assigned address may be unloaded from the unused tagged monitor, freeing that tagged monitor to become "available" for use elsewhere.

The basic monitor 136 is configured to maintain exclusive access to addresses in the shared memory 120 that are not monitored by the tagged monitors 135. The basic monitor 136 is further configured to enable successive exclusive accesses to an address assigned to a tagged monitor. The basic monitor 136 refers to a collection of monitor bits, one bit per logical processor, for monitoring exclusive access to shared memory 120.

The tiers refer to the order in which the monitors are used to monitor exclusive accesses. When an exclusive access occurs, the tag monitors 135 are used first, and then the basic monitor 136 is used.

In some embodiments, such as the system 100 of FIG. 1, the system directory 134 further includes a snoop filter 137 at a third tier. The snoop filter 137 keeps track of owners and sharers of all cache lines that are allocated into it. The snoop filter 137 also interrogates the LPs to ensure that all of the LPs have the same coherent view. In certain instances, the snoop filter 137 may request a requester to invalidate its cache line, whereby the cache line becomes lost. The system directory 134 can identify cache lines that have become lost.

Figure 2:
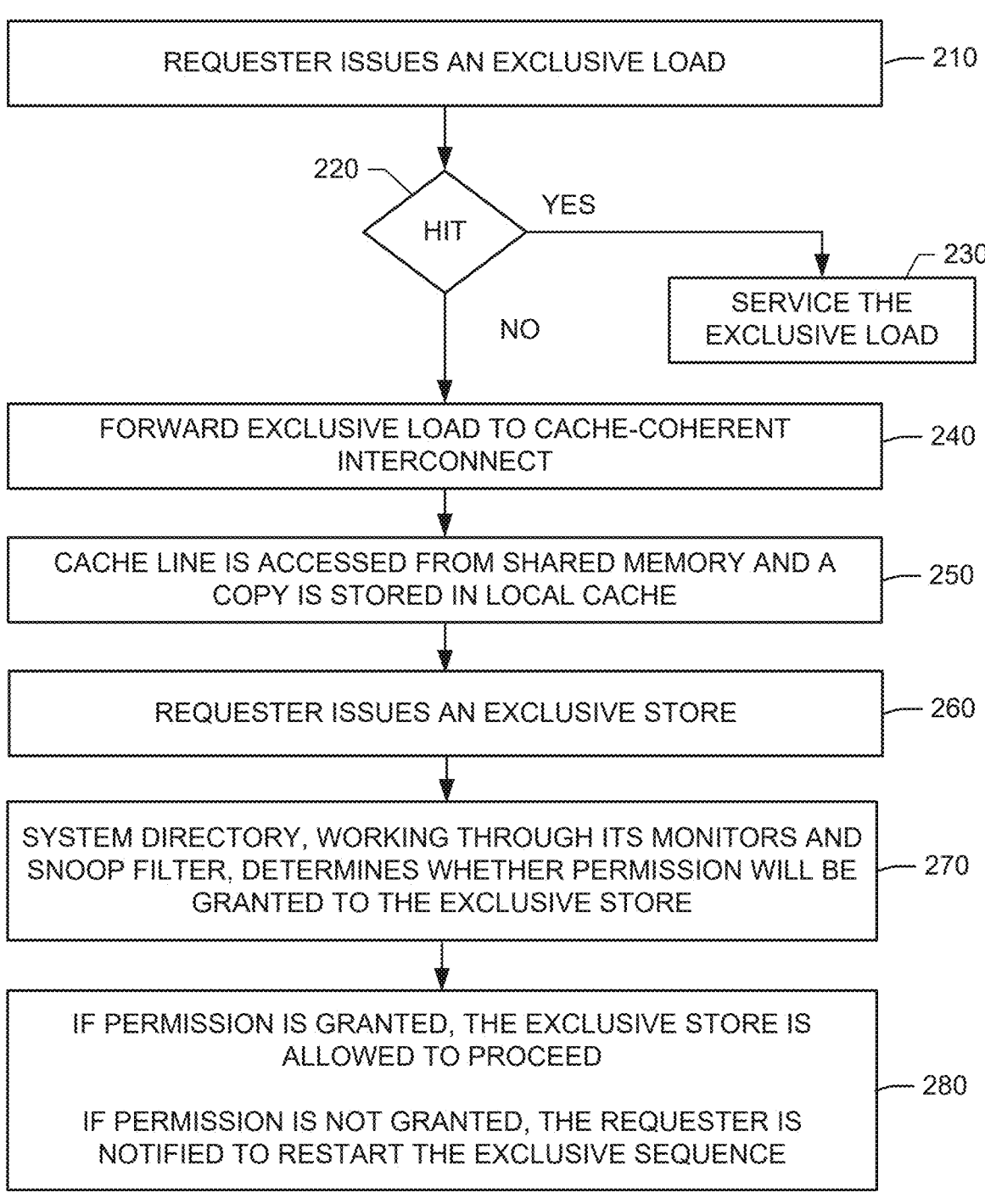
FIG. 2 shows a method of handling an exclusive access sequence in the electronic system in accordance with various aspects and embodiments herein.

Additional reference is made to FIG. 2, which illustrates the handling of an exclusive access sequence by a requester. At block 210, the requester issues an exclusive load. The exclusive load specifies an address of a cache line.

At block 220, if the exclusive load results in a hit (i.e., there is a cache line copy in the local cache), the exclusive load is serviced and, therefore, not propagated to the cache-coherent interconnect 130 (block 230).

If a cache line copy is not in the local cache (block 220), the exclusive load is forwarded to the cache-coherent interconnect 130 (block 240).

At block 250, the cache-coherent interconnect 130 retrieves a cache line at the address in shared memory 120. A copy of the cache line is stored in local cache of the requester.

At block 260, the requester attempts to modify the cache line. The requester sends an exclusive store to the cache-coherent interconnect 130.

The cache-coherent interconnect 130 will serialize the exclusive store and coordinate the operation among the LPs. At blocks 270 and 280, the system directory 134, working through its monitors and snoop filter 135-137, determines whether permission will be granted to the exclusive store. If permission is not granted, the system directory 134 notifies the requester to restart the exclusive sequence. If permission is granted, the exclusive store is allowed to proceed. The cache line in the requester's local cache is updated, and the system directory 134 requests the other LPs to invalidate their cache lines.

FIG. 3 illustrates a general method of how the system directory 134, working through its monitors 135 and 136, indicates whether permission to attempt an exclusive store at an address monitored by a tagged monitor will be granted or denied. At block 310, multiple LPs are allowed to attempt exclusive accesses, and those LPs that attempt the exclusive access (e.g., with an exclusive load) are registered. At block 320, a requester attempts an exclusive store at an address. At block 330, the exclusive store is allowed to proceed if the requester is registered with the associated tagged monitor 135, or if the basic monitor 136 permits a sequential exclusive store. At block 340, the requester is registered with the basic monitor 136, and all of the other LPs are unregistered with the associated tagged monitor 135. Unregistering the other LPs creates a race condition. The first registered LP to write to an address will win the race, and only it (the "winner") is allowed to attempt the exclusive store. Registering the requester with the basic monitor 136 enables another sequential exclusive store.

The combination of tagged monitors 135 and the basic monitor 136 in separate tiers in the system directory 134 overcomes certain drawbacks associated with an electronic system that uses only a basic monitor for exclusive cache coherence or an electronic system that uses only tagged monitors for exclusive cache coherence. The drawback with a system that uses only a basic monitor is performance. Writes might be attempted in parallel to multiple address, but the basic monitor does not differentiate between addresses and does not fire more than one at any given time. A drawback with the tagged monitors is that they are costly. Moreover, looking up a very large number of tagged monitors in parallel in a single clock cycle can be a timing challenge for high-speed designs.

The system directory 134 strikes a balance between the basic monitor 136 and the tagged monitors 135 and achieves monitoring of addresses in a computationally cost effective manner. The basic monitor 136 functions as a "catch-all" for all cache lines that are not monitored by the tagged monitors. As for cache lines that are monitored by tagged monitors, the basic monitor enables sequential exclusive accesses in a computationally efficient manner. And, as described below, the system directory 134 can be scaled upwards to accommodate an electronic system having many logical processors.

The system directory 134 provides a point of coherence. All coherent transactions, exclusive or not, are serialized and processed at the system directory 134.

Figure 4:
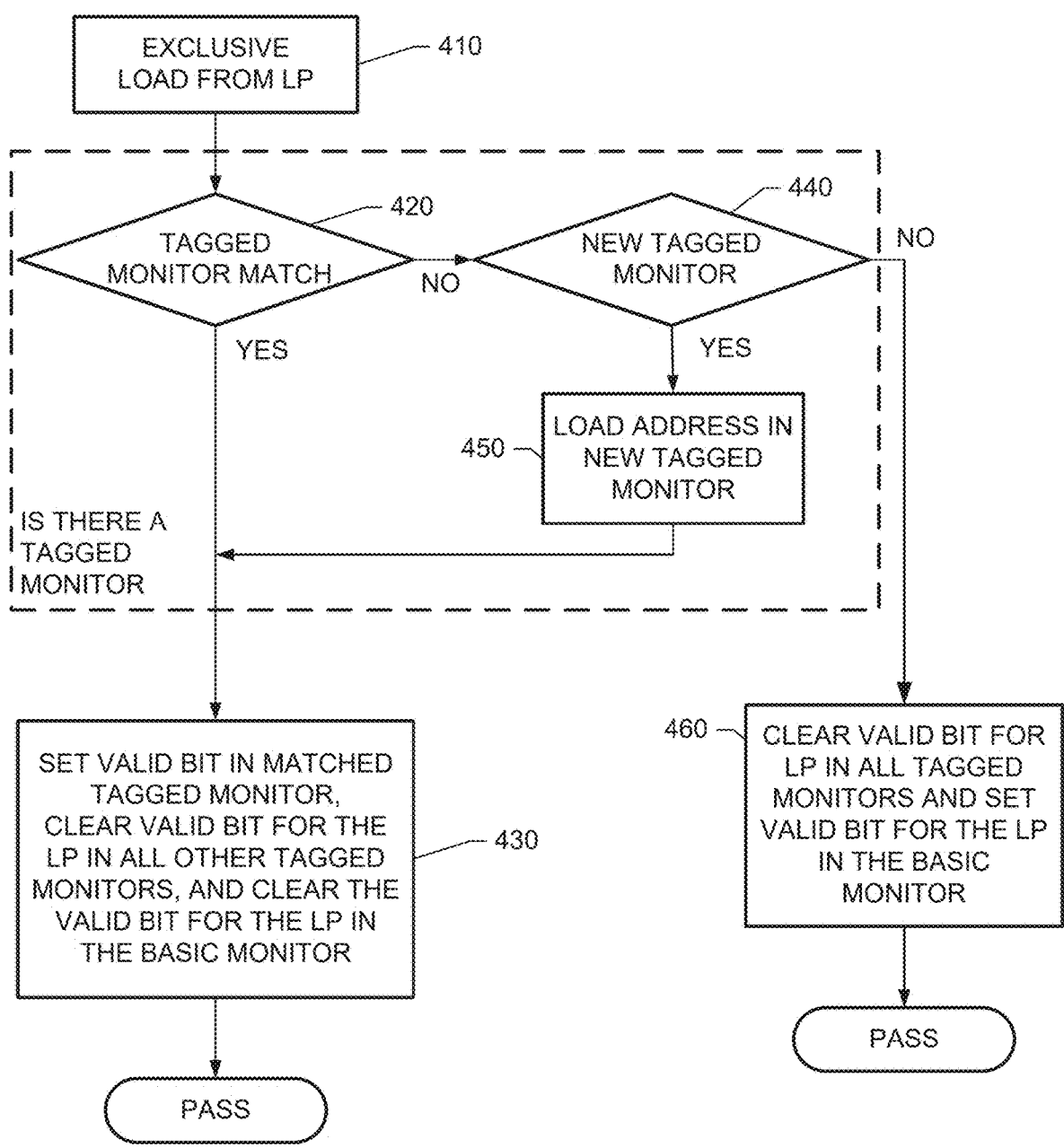
FIG. 4 shows a method of handling an attempt at an exclusive load in accordance with various aspects and embodiments herein.

Reference is now made to FIG. 4, which illustrates a method of registering those LPs that attempt the exclusive accesses. At block 410, an LP begins an attempt at an exclusive access sequence by attempting an exclusive load at an address. At block 420, a determination is made whether there is a tagged monitor assigned to that address. If there is an assigned tagged monitor for that address, then at block 430, the LP is registered with that tagged monitor and it is unregistered with all of the other tagged monitors. Further, the LP is unregistered with the basic monitor.

If there are no assigned tagged monitors for the address (block 420), but an unused tagged monitor is available (block 440), then the address is loaded in the available tagged monitor (block 450) and block 430 is performed.

If there are no tagged monitors assigned or available (blocks 420 and 440), then the LP is unregistered with all of the tagged monitors (block 460). Further, the LP is registered with the basic monitor (block 460).

Figure 5A:
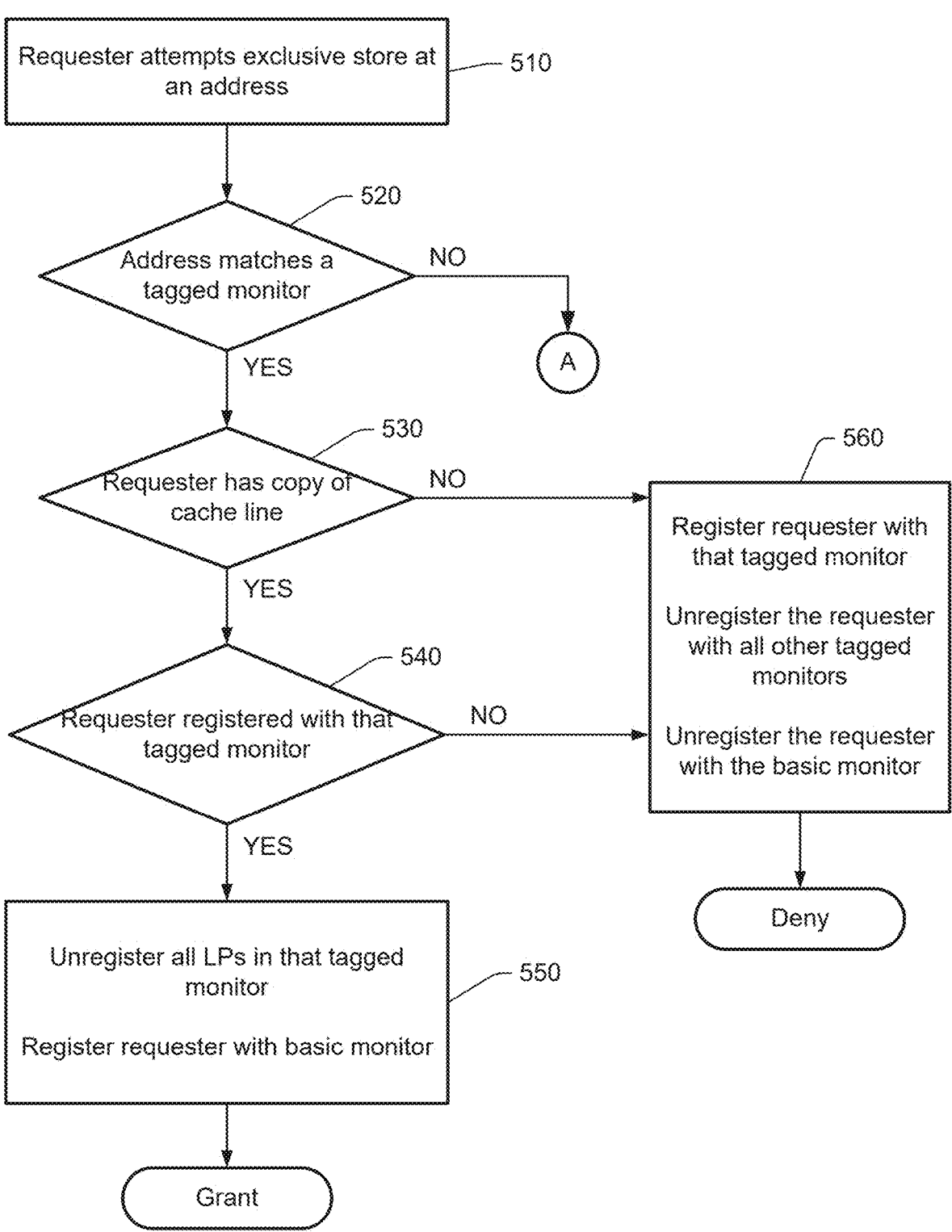
FIGS. 5A and 5B show a method of handling an attempt at an exclusive store in accordance with various aspects and embodiments herein.
Figure 5B:
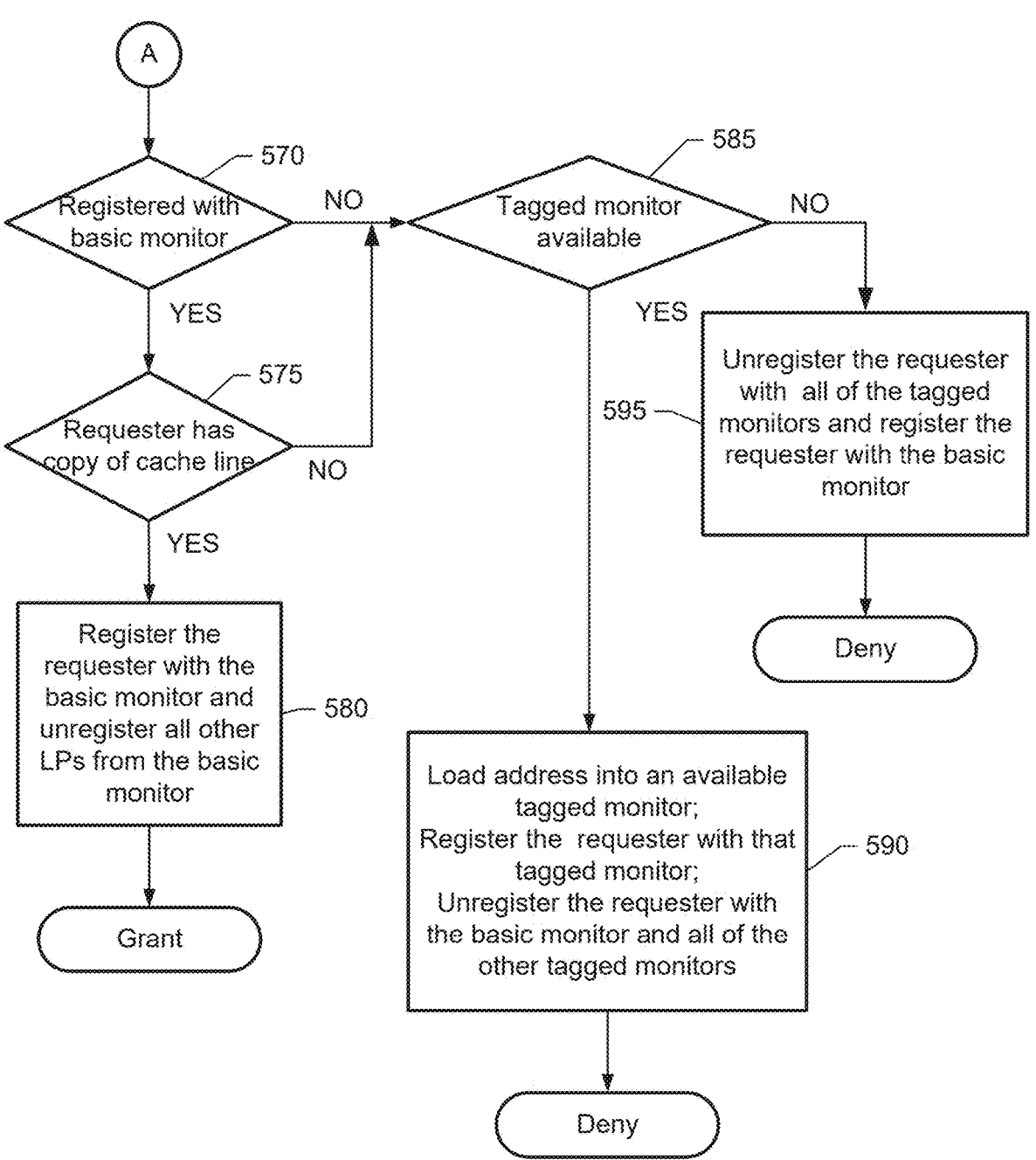

Reference is now made to FIGS. 5A and 5B, which illustrates a method of granting or denying permission to an attempted exclusive store. At block 510, an LP (the requester) attempts an exclusive store at an address in shared memory.

The address is compared to the addresses loaded in the tagged monitors. If the address matches one of the tagged monitors (block 520), and if the requester has a copy of the cache line at the address, and if the requester is registered with the matched tagged monitor (block 540), then all LPs are unregistered with the matched tagged monitor, and the requester is registered with the basic monitor (block 550).

If the requester does not have a cache line (block 530), or if the requester is not registered with the matched tagged monitor, the requester is registered with the matched tagged monitor, unregistered with all of the other tagged monitors; and unregistered with the basic monitor (block 560). Permission to perform the exclusive store is denied.

If the address does not match one of the tagged monitors (block 520), and if the requester is registered with the basic monitor (block 570), and if the requester has a copy of the cache line at the address (block 575), then all other LPs are unregistered from the basic monitor (block 580), and permission is granted to proceed with the exclusive store. The requester now has permission to proceed to perform a store to the cache line in its local cache (e.g., L1, L2, or L3 cache).

There are certain scenarios in which a cache line is lost while an exclusive store is in progress. For example, another LP can issue commands that cause the cache line to be lost while the exclusive store is in progress. If this happens, the exclusive stored must not be successful.

If the requester does not have a copy of the cache line (block 575), access to the requester is denied, and control is directed to block 585 so that the requester is registered with one of the monitors.

If the requester is not registered with the basic monitor, a determination is made as to whether any tagged monitors are available (block 585). The requester is registered with one of the monitors, and permission is denied. If a tagged monitor is available, then the address is loaded in that tagged monitor, the requester is registered with that tagged monitor, and the requester is unregistered with the basic monitor and all of the other tagged monitors (block 590). If no tagged monitors are available (block 585), then the requester is unregistered with all of the tagged monitors and registered with the basic monitor (block 595).

FIG. 8 illustrates a simple example of the method above. The simple example involves a single tagged monitor for address X at tier 1 and a basic monitor at tier 2. LP A and LP B both attempt exclusive accesses to address X.

Block 810 represents an initial state, where neither LP A nor LP B is registered with the monitors. Thus, the bits of the tagged monitor are 0 0, and the bits of the basic monitor are 0 0.

At block 820, LP A is first to attempt an exclusive load to address X. Only the bits of the tagged monitor reflect this attempt, and are set to 1 0. The bits of the basic monitor remain at 0 0.

Next at block 830, LP B attempts an exclusive load to address X. The bits of the tagged monitor are updated to 1 1, which means that both of the LPS A and B are registered with the tagged monitor.

At block 840, LP A is the first to attempt an exclusive store to address X. Both bits in the tagged monitor are cleared, and the basic monitor is updated to 1 0, which means LP A is now registered with the basic monitor, and permission is granted to LP A to proceed with the exclusive store at address X. In the meantime, LP B is unregistered from the tagged monitor. Also, LP A is unregistered from the tagged monitor. Since all bits for LPs are cleared, the address is unloaded from the tagged monitor, whereby the tagged monitor becomes available.

At block 850, LP B then attempts an exclusive store to address X, but permission is denied, since LP B was just unregistered from the tagged monitor. However, the exclusive access attempt causes LP B to be re-registered with the tagged monitor. The bits of the tagged monitor are updated to 0 1.

At block 860, LP B once again attempts the exclusive store. This time, permission is granted to LP B. Both bits of the tagged monitor are cleared. In addition, both bits of the basic monitor are set to 1. As a result, either LP A or LP B can perform a sequential exclusive store. A race condition is once again created with respect to first-to-store.

At block 870, LP A is the first to attempt another exclusive store to address X. Permission is granted, and the basic monitor bit corresponding to LP B is set to 0.

FIG. 9 illustrates a simple example involving a tagged monitor for address X at tier 1, and a basic monitor at tier 2. LP A and LP B attempt exclusive accesses to addresses X and Y. Address Y is not monitored by a tagged monitor.

Block 910 represents an initial state, where neither LP A nor LP B is registered with the monitors. Thus, the bits of the tagged monitor are 0 0, and the bits of the basic monitor are 0 0.

At block 920, LP A attempts an exclusive load from address X. LP A is registered with the tagged monitor, whose bits are updated to 1 0.

At block 930, LP B attempts an exclusive load from address Y, The tagged monitor is not affected (since it only monitors address X), but LP B is registered with the basic monitor, whose bits are updated to 0 1.

At block 940, LP A attempts an exclusive store to address X. Permission is granted, both bits of the tagged monitor are cleared, and LP A is also registered with the basic monitor, whose bits are updated to 1 1.

At block 950, LP B attempts an exclusive store to address Y. Since LP B is registered with the basic monitor, and no tagged monitors are involved, permission is granted. Moreover, LP A is unregistered with the basic monitor. As a result, LP B can now make sequential exclusive accesses to address Y.

The electronic system 100 is not limited to any particular cache-coherent interconnect 130. In some embodiments, however, the electronic system 100 is a system on-chip (SoC), and the cache-coherent interconnect 130 includes a cache-coherent network-on-chip (NoC).

Figure 6:
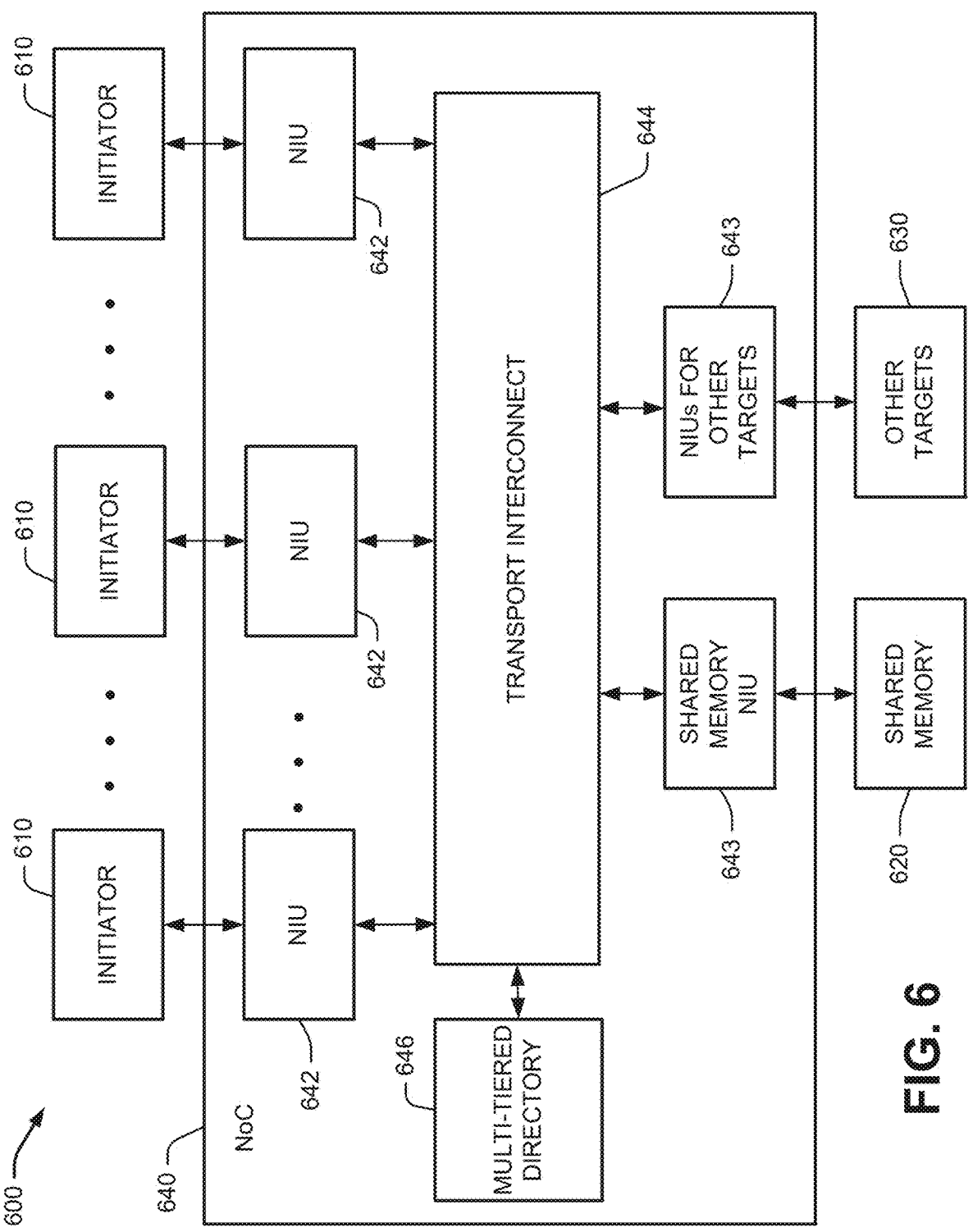
FIG. 6 shows a system-on-chip (SoC) including a cache-coherent network-on-chip in accordance with various aspects and embodiments herein.

Reference is made to FIG. 6, which illustrates an SoC 600 including a plurality of initiators 610, shared memory 620, other targets 630 and a cache coherent NoC 640. The initiators 610 generate request transactions. A request transaction may contain one or more destination addresses for one or more components the transaction is sent to. The address may include the address of a sub-component (e.g., an individual register within an array of registers, internal memory, etc.). The NoC 640 decodes the address and transports the request transaction to the destination address(es). The target 620 or 630 handles the request transaction and sends a response transaction back to the initiator via the NoC 640.

The NoC 640 includes a plurality of network interface units (NIUs) 642 and 643 and a transport interconnect 644. Each initiator 610 is coupled to the transport interconnect 644 via a corresponding NIU 642. Each target 620, 630 is coupled to the transport interconnect 644 via a corresponding NIU 643. Thus, the shared memory 620 is coupled to the transport interconnect 644 via a shared memory NIU 643, and the other targets 630 are coupled to the transport interconnect 644 via NIUs 643.

Each NIU 642 or 643 is configured to convert the protocol used by its corresponding initiator 610 or target 620,630 into a transport protocol used inside the NoC 640. The transport protocol is typically based on the transmission of packets.

The transport interconnect 644 transports packets between the NIUs 642 and 643. The transport interconnect 644 includes switches, adapters, and buffers. Switches may be used to route flows of traffic between source and destinations. Adapters may be used to deal with various conversions between data width, clock and power domains. Buffers may be used to insert pipelining elements to span long distances, or to store packets to deal with rate adaptation between fast senders and slow receivers or vice-versa.

The NoC 640 includes a multi-tiered directory 646 of tagged monitors, a basic monitor and optionally one or more snoop filters. The directory 646 ensures cache coherence across the SoC 600 as described herein. The directory 646 may include a dedicated processor (e.g., memory and a state machine) that facilitates communication across the NoC 640 and ensures cache coherence.

In some embodiments, the SoC 600 may further include a network that is not cache-coherent. Such a network is not illustrated in FIG. 6.

Although FIG. 6 shows a single directory 646, an electronic system herein is not so limited. Some embodiments of an electronics system herein may employ multiple system directories. Each system directory is responsible for a slice of shared memory. The system directories are interleaved by a factor of N, and the memory slices are interleaved by a factor of N.

Figure 7:
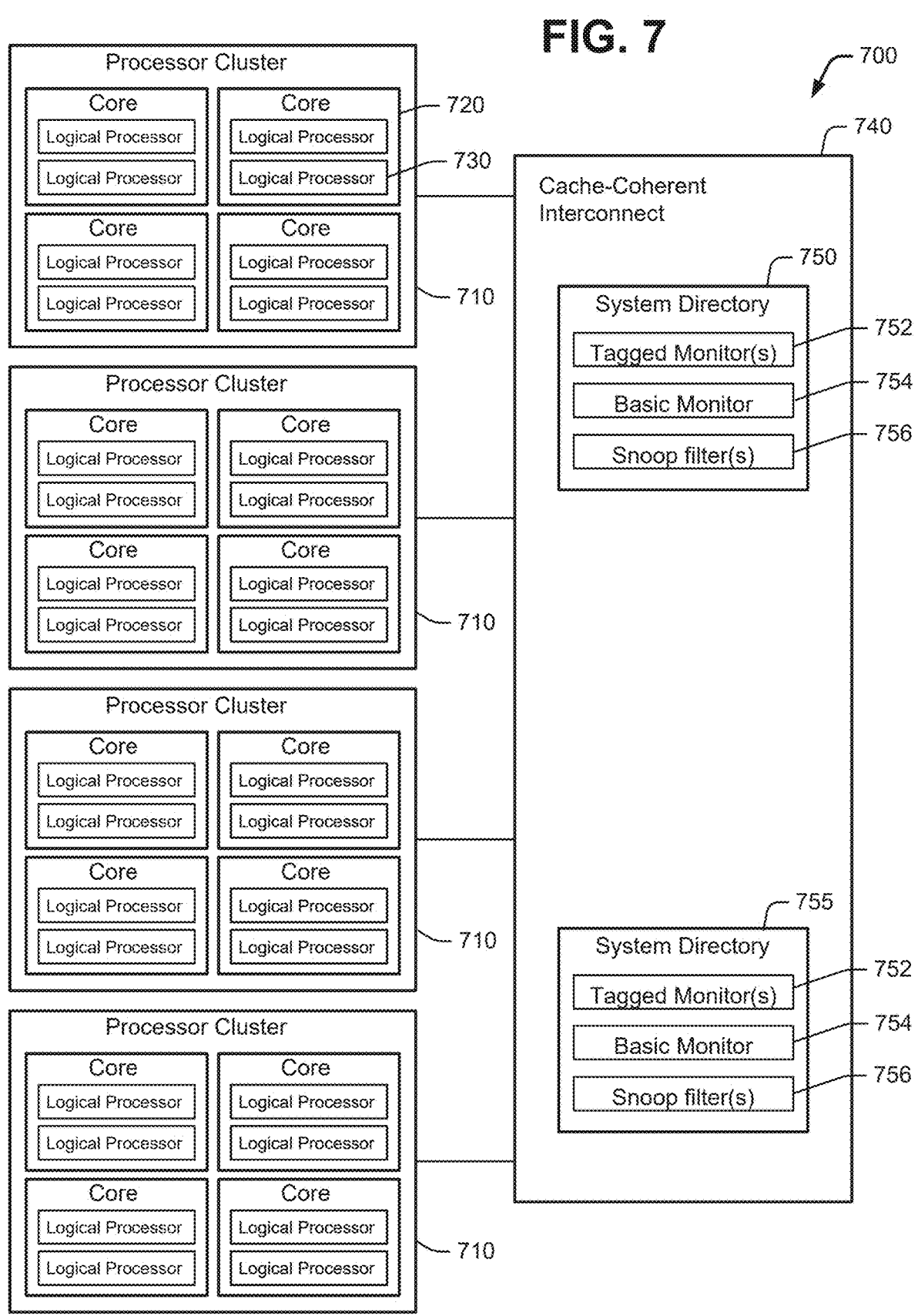
FIG. 7 shows an electronic system including a cache-coherent interconnect having system directories that are interleaved in accordance with various aspects and embodiments herein.

Reference is now made to FIG. 7, which shows a SoC 700 having four processor clusters 710. Each processor cluster has four physical cores 720, and each physical core 720 has two LPs 730. Thus, the SoC 700 has a total of thirty two LPs 730.

The SoC 700 further includes a cache coherent NoC 740. The NoC 740 includes first and second system directories 750 and 755. Each system directory 750 and 755 includes tagged monitors 752, a basic monitor 754, and snoop filter(s) 756. To simplify the presentation of the NoC 740, the NIUs and transport interconnect are not illustrated.

Each system directory 750 and 755 is responsible for a slice of the shared memory. The system directories 750 are interleaved by a factor of N=2, and the memory slices are interleaved by a factor of N=2. As an example, the first directory 750 is responsible for even cache line addresses, and the second system directory 755 is responsible for odd cache line addresses. Stored semaphores may also be interleaved, for example, by storing them in different partitions in shared memory.

The NoC 740 is scalable. The number of system directories 750 can be increased as the number of logical processors 730 is increased.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Various examples are methods that use the behavior of either or a combination of machines. Method examples are complete wherever in the world most constituent steps occur. For example, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. An electronic system comprising:
a plurality of logical processors;
an interconnect;
shared memory accessible by the logical processors (LPs) via the interconnect; and
a system directory including one or more tagged monitors at a first tier and a basic monitor at a second tier, the tagged monitors configured to maintain exclusive cache coherence over a first set of addresses in the shared memory, the basic monitor configured to maintain exclusive cache coherence over addresses in the shared memory that are not monitored by the tagged monitors.

2. The system of claim 1, wherein the basic monitor is further configured to enable sequential exclusive accesses to addresses monitored by the tagged monitors.

3. The system of claim 1, wherein the system directory further includes a snoop filter at a third tier configured to keep track of owners and sharers of all allocated cache lines; and identify any allocated cache lines that are lost.

4. The system of claim 1, wherein each tagged monitor is configured to keep track of exclusive accesses by the LPs to an assigned address; wherein the basic monitor is configured to keep track of exclusive accesses by the LPs to the shared memory; and wherein the system directory is configured to allow multiple LPs to attempt exclusive accesses concurrently.

5. The system of claim 4, wherein when an LP (a requester) attempts an exclusive load from an address:
if a tagged monitor is associated with the address, the requester is registered with that tagged monitor and unregistered with all other tagged monitors; and
the requester is unregistered with the basic monitor.

6. The system of claim 5, wherein if no tagged monitor is associated with the address and no other tagged monitors are available, the requester is unregistered with all of the tagged monitors, and the requester is registered with the basic monitor.

7. The system of claim 4, wherein the system directory is further configured to decide upon whether to grant permission to those LPs that attempt exclusive stores.

8. The system of claim 7, wherein when an LP (a requester) attempts an exclusive store to an address:
if the address matches one of the tagged monitors and if the requester is registered with the one tagged monitor, then:
all LPs are unregistered with the one tagged monitor;
the requester is registered with the basic monitor; and
permission is granted.

9. The system of claim 8, wherein if the requester does not have a copy of cache line:
the requester is registered with the one tagged monitor, unregistered with all other tagged monitors; and unregistered with the basic monitor; and
permission is denied.

10. The system of claim 8, wherein if the requester is not registered with the one tagged monitor:

the requester is registered with the one tagged monitor, unregistered with all other tagged monitors; and unregistered with the basic monitor; and permission is denied.

11. The system of claim 7, wherein when an LP (requester) attempts an exclusive store to an address that does not match any of the tagged monitors and the requester is registered with the basic monitor:

all other LPs are unregistered from the basic monitor; and permission is granted.

12. The system of claim 11, wherein if the requester does not have a copy of a cache line at the address, permission is instead denied, and the requester is registered with one of the monitors.

13. The system of claim 7, wherein when an LP (requester) attempts an exclusive store to an address, and the requester is not registered with the basic monitor:

permission is denied; and if no tagged monitors are available, then the requester is unregistered with all of the tagged monitors and registered with the basic monitor;

else if a given tagged monitor is available, then the address is loaded in the given tagged monitor;

the requester is registered with the given tagged monitor; and the requester is unregistered with the basic monitor and all other tagged monitors.

14. The system of claim 1, wherein the system is a system-on-chip including a cache-coherent network-on-chip, and wherein the cache-coherent network-on-chip includes the interconnect and the system directory.

15. The system of claim 1, further comprising at least one additional system directory including at a plurality of tagged monitors at a first tier and a basic monitor at a second tier; wherein each system directory is responsible for a slice of the shared memory; and wherein the system directories are interleaved by a factor of N, and the memory slices are interleaved by a factor of N.

16. A cache coherent network on chip (NoC) comprising:

a plurality of initiator network interface units;

a shared memory network interface unit;

a transport interconnect configured to transport packets between the network interface units; and a system directory including one or more tagged monitors at a first tier and a basic monitor at a second tier, the tagged monitors configured to maintain exclusive cache coherence over a set of semaphore addresses in the shared memory, the basic monitor configured to maintain exclusive cache coherence over semaphore addresses in the shared memory that are not monitored by the tagged monitors.

17. The NoC of claim 16, wherein the basic monitor is further configured to enable sequential exclusive accesses to addresses monitored by the tagged monitors.

18. The NoC of claim 16, wherein the system directory further includes a snoop filter at a third tier for keeping track of owners and sharers of all allocated semaphores, and for identifying those of the allocated semaphores that are lost.

19. A directory-based method for an electronic system including a plurality of initiators, shared memory and an interconnect coupled to the initiators and the shared memory, the method comprising:

performing tagged monitoring at a first tier to maintain exclusive cache coherence over a set of cache line addresses in the shared memory; and concurrently performing basic monitoring at a second tier to maintain exclusive cache coherence over cache line addresses in the shared memory that are not monitored by the tagged monitors.

20. The method of claim 19, further comprising performing snoop filtering at a third tier to keep track of owners and sharers of all allocated cache lines; and identifying those of the allocated cache lines that are lost.

* * * * *